US009621422B2

(12) United States Patent
Agrawal et al.

(10) Patent No.: US 9,621,422 B2
(45) Date of Patent: Apr. 11, 2017

(54) DEVICE TO DEVICE CONTENT UPGRADES (71) Applicant: Google Technology Holdings LLC, Mountain View, CA (US)

(72) Inventors: Jagadish Kumar Agrawal, Santa Clara, CA (US); Sujoy Das, Grayslake, IL (US); Nathan J Fortin, Morgan Hill, CA (US); Jordan Andrew Hurwich, Palo Alto, CA (US); Catherine T Nguyen, Mountain View, CA (US); Sheila A Vyas, San Carlos, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 298 days.

(21) Appl. No.: 14/313,236

(22) Filed: Jun. 24, 2014

(65) Prior Publication Data
US 2015/0372859 A1   Dec. 24, 2015

(51) Int. Cl.
*G06F 15/177*   (2006.01)
*H04L 12/24*   (2006.01)
(Continued)

(52) U.S. Cl.
CPC .............. *H04L 41/082* (2013.01); *G06F 8/61* (2013.01); *G06F 8/65* (2013.01); *G06F 8/67* (2013.01);
(Continued)

(58) Field of Classification Search
None
See application file for complete search history.

(56) References Cited

U.S. PATENT DOCUMENTS

2007/0130626 A1   6/2007 Kato et al.
2008/0301660 A1   12/2008 Rao et al.
(Continued)

FOREIGN PATENT DOCUMENTS

EP   2669795 A1   12/2013
WO   2009/106858 A1   9/2009

OTHER PUBLICATIONS

European Patent Office; International Search Report and Written Opinion; International Application No. PCT/US2015/037415; dated Aug. 28, 2015.
(Continued)

*Primary Examiner* — John B Walsh
(74) *Attorney, Agent, or Firm* — Faegre Baker Daniels LLP (57) ABSTRACT In embodiments of device to device content upgrades, a computing device includes a peer sharing manager that shares content and upgrades to content with peer devices. The computing device downloads content and upgrades from sources on the Internet, and shares the content and upgrades with peer devices that lack an Internet connection. A lowest supported version of the content can be shared from the computing device to one of the peer devices. The lowest supported version of the content determines capabilities of the peer device and establishes a peer-to-peer communication link with the computing device. The peer device reports the capability information to the computing device and, if the computing device determines that the peer device is capable of supporting an upgraded version of the content, the computing device communicates the upgraded version of the content to the peer device.

20 Claims, 5 Drawing Sheets (51) Int. Cl.
*H04L 29/08* (2006.01)
*G06F 9/445* (2006.01)
*G06F 9/44* (2006.01)

(52) U.S. Cl.
CPC ............ *G06F 8/71* (2013.01); *H04L 67/1085* (2013.01); *H04L 67/1091* (2013.01)

(56) References Cited

U.S. PATENT DOCUMENTS

| | | | | |
|---|---|---|---|---|
| 2013/0325949 A1* | 12/2013 | Virani | ..................... | G06F 9/541 |
| | | | | 709/204 |
| 2014/0227976 A1* | 8/2014 | Callaghan | ................ | G06F 8/65 |
| | | | | 455/41.2 |
| 2015/0180714 A1* | 6/2015 | Chunn | ................ | H04L 41/0813 |
| | | | | 709/221 |

OTHER PUBLICATIONS

Lenovo, "SHAREit", http://kc.lenovo.com/, Jun. 2, 2014, 1 page.

* cited by examiner

DEVICE TO DEVICE CONTENT UPGRADES

BACKGROUND

Downloads and upgrades of software applications and other various types of digital content to computing devices typically require an Internet connection to on-line stores or distributors to obtain the software applications and digital content, or to upgrade the software applications and digital content with updated versions. There are however, some devices that do not have a continuous Internet connection, which makes it difficult for a user to obtain, or keep current, the software applications and other digital content on his or her devices. Other devices in proximity to a user's device may have applications or other digital content that could be used as a source for obtaining the applications or digital content, but the capabilities of various devices is not consistent. Traditionally, the logic for downloading the correct version of an application to a device is maintained in an on-line store, which receives information about the device requesting the application. The on-line store can then choose the correct version of a requested application to download that is compatible with the requesting device.

BRIEF DESCRIPTION OF THE DRAWINGS

Embodiments of device to device content upgrades are described with reference to the following Figures. The same numbers may be used throughout to reference like features and components that are shown in the Figures.

DETAILED DESCRIPTION

Embodiments of device to device content upgrades are described for various forms of computing devices, such as a mobile phone or tablet device, a computer, or a mobile hotspot. A computing device may be any form of device that has storage for content, and the capability to communicate with peer devices to either share the content with a peer device, or upgrade the content on the peer device. The content may be a software application, media file, and/or any other type of digital content, as well as upgrades associated with the application, media file, and the digital content. For example, the digital content may be a video file of a television show, with the upgrade being additional episodes of the television show. The digital content may also be any other form of content that can be shared and/or upgraded, such as from one version of a software application that is upgraded to the next version.

In implementations, a computing device may be a first peer device that shares a software application and/or media content with a second peer device, or may be the second peer device that receives the shared software application and/or media content from the first peer device. The first peer device can initially communicate a lowest supported version of content (e.g., a software application) to the second peer device that then installs the content on the device. The lowest supported version of the content can determine the capabilities of the second peer device, such as API versions and a hardware configuration, and can also request to establish peer-to-peer communications with the first peer device. The first peer device can assess the determined capability information about the second peer device to determine whether an upgraded version of the content is compatible with the second peer device. If the upgraded version of the content is compatible with the second peer device, as determined based on the compatibility information, then the first peer device communicates the upgraded version of the content application to the second peer device.

While features and concepts of device to device content upgrades can be implemented in any number of different devices, systems, networks, and/or configurations, embodiments of device to device content upgrades are described in the context of the following example devices, systems, and methods.

Figure 1:
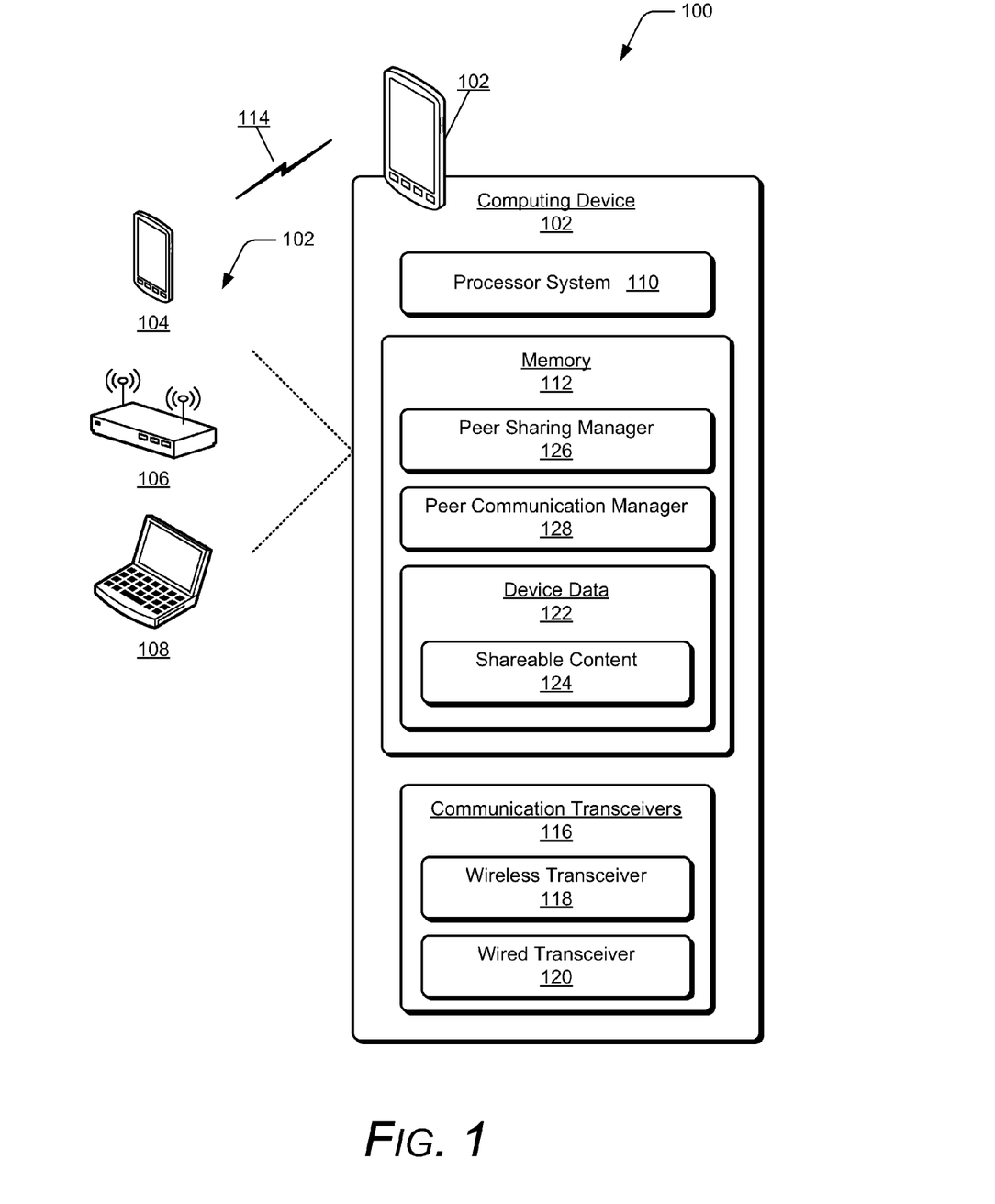
FIG. 1 illustrates an example system in which embodiments of device to device content upgrades can be implemented.

FIG. 1 illustrates an example system 100 in which embodiments of device to device content upgrades can be implemented. The example system 100 includes a computing device 102, such as a mobile device 104, a mobile hotspot 106, or a computer 108. The computing device 102 may be any type of wired or wireless electronic and/or computing device, such as a mobile phone, tablet computer, handheld navigation device, portable gaming device, media playback device, or any other type of electronic and/or computing device. Generally, any of the devices described herein can be implemented with various components, such as a processing system 110 and memory 112, as well as any number and combination of differing components as further described with reference to the example device shown in FIG. 5.

As described herein, any of the computing devices may each be a peer device and can be connected via a network 114, such as over a peer-to-peer network, to other peer devices. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The computing device 102 may include any suitable type of communication transceivers 116, including a wireless transceiver 118 for communication via a wireless network (e.g., a mesh network) and/or a wired transceiver 120 for wired communication. The wireless transceiver 118 may be any type of transceiver configured to communicate via a wireless network, such as a wireless wide-area network (WWAN), a wireless local-area network (WLAN), and a wireless personal-area network (wireless PAN), each of which may be configured in part or entirely as infrastructure, ad-hoc, or mesh networks. For example, the wireless transceiver 118 can be implemented as a short-range wireless transceiver to communicate over a wireless personal-area-network (PAN) in accordance with a Bluetooth™ and/or Bluetooth™ low energy (BTLE) protocol. The Bluetooth™ family of protocols support various communication profiles for communicating various types of data and/or enabling different feature sets between devices connected for communication via a wireless PAN.

The Bluetooth™ and/or BTLE family of protocols also support "pairing" between devices, which may enable the computing device 102 to associate with other peer devices. When initially pairing with another device, the computing device 102 can store self-identifying information (e.g., a medium access control (MAC) address) associated with the other device in an information table (e.g., a pairing table) for future use. The information table can also store a context associated with the other device, such as an identity of a user, a mode of use for the computing device 102, and/or a location of the other device. For example, the computing device 102 may communicate with a peer device that has shareable content and is within proximity whenever the wireless transceiver 118 using Bluetooth™ is able to communicate with the paired peer device. Alternatively, the wireless transceiver may be implemented for near-field communication (NFC), to enable NFC with the peer device, in accordance with various NFC standards, such as ISO 18000-3, ISO/IEC 18092, ECMA-340, ISO/IEC 21481, and ECMA 352, just to name a few.

The computing device 102 includes the wired transceiver 120 that may include wired data interfaces for communicating with other devices, such as an Ethernet transceiver, serial data interface, audio/video port (e.g., high-definition multimedia interface (HDMI) port), or universal serial bus (USB) port. These wired data interfaces may be implemented using standard connectors or through the use of proprietary connectors and associated cables providing enhanced security or interconnect density.

The computing device 102 includes device data 122 that may include shareable content 124, which is maintained in the memory 112 on the device and designated as shareable, such as by a user of the computing device. The shareable content 124 can include any content items that may be shareable between the devices, such as music, documents, emails, contacts, applications, and any other type of audio, video, and/or image data. Alternatively or in addition, the device data 122 may include other device and/or user data that is not shareable.

The computing device 102 also includes device applications that implement embodiments of device to device content upgrades. In this example, the computing device includes a peer sharing manager 126 and a peer communication manager 128 that can be implemented as software applications or modules (e.g., computer-executable instructions) stored on computer-readable storage memory, such as any suitable memory device or electronic data storage (e.g., the memory 112), and executed with the processing system 110. Although shown and described as separate manager modules, the peer sharing manager 126 and the peer communication manager 128 can be implemented together as a single software application or module. Implementations and functions of the manager modules are further described with reference to FIGS. 2-4.

Figure 2:
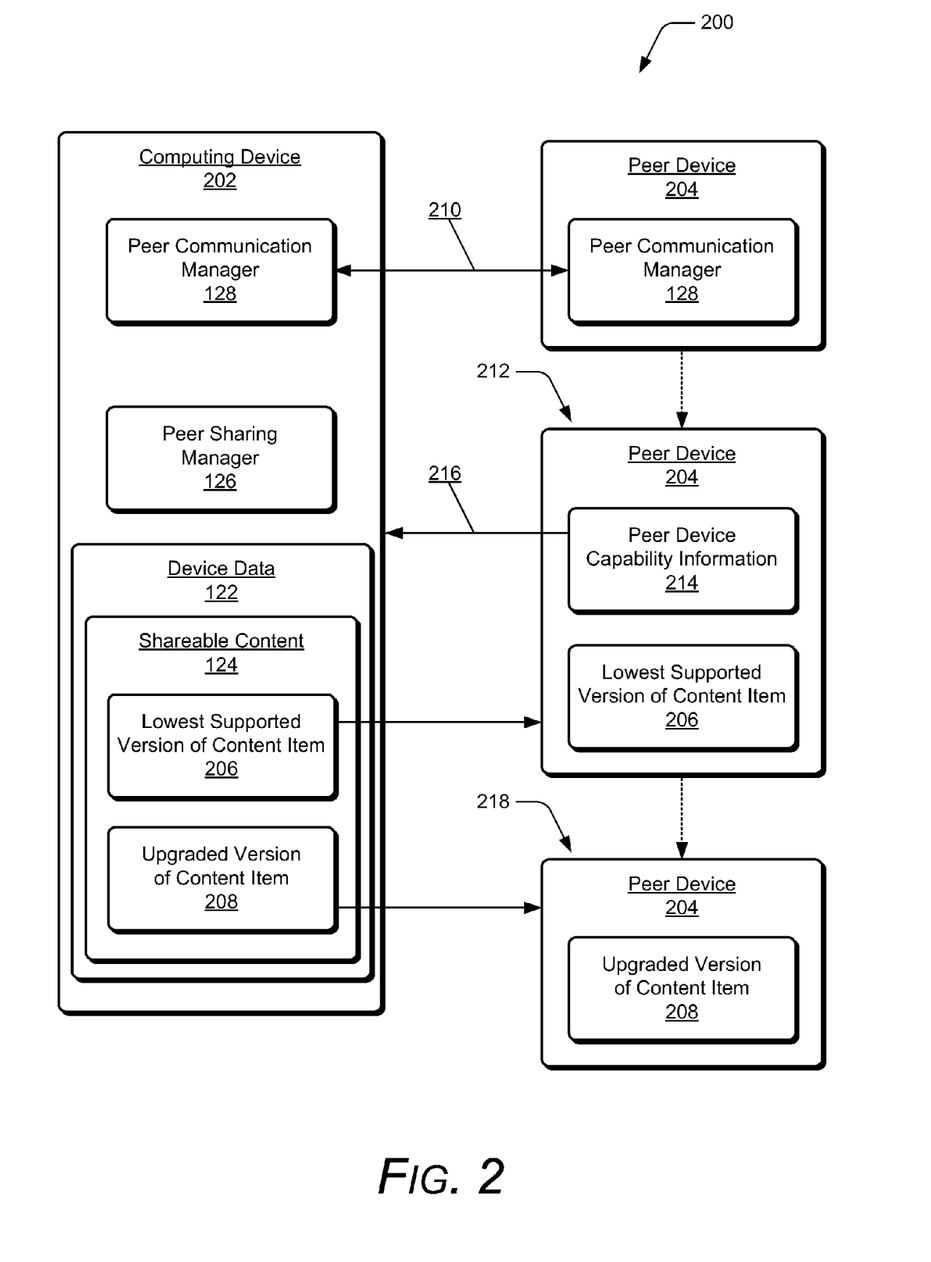
FIG. 2 illustrates an example operation of a system in which embodiments of device to device content upgrades can be implemented.

FIG. 2 illustrates an example system 200 with examples of the computing device 102 implemented as peer devices, such as a first peer device (referred to and shown as computing device 202) and a second peer device 204 that may each be implemented as any of the devices described with reference to FIG. 1. Simply for ease of discussion, the first peer device is referred to as the computing device 202 that is implemented for peer-to-peer communication with the second peer device 204, such as via the communication network 114 described with reference to FIG. 1. In this example, the computing device 202 is shown to implement the peer sharing manager 126 and a first instance of the peer communication manager 128. The peer device 204 is shown to implement a second instance of the peer communication manager 128. In practice, however, both the computing device and the peer device can each implement the peer sharing manager 126 and the peer communication manager 128, as described with reference to the computing device 102 shown in FIG. 1.

The peer sharing manager 126 at the computing device 202 is implemented to manage sharing content items of the shareable content 124 in the device data 122 that is maintained on the computing device 202 with other peer devices, such as the peer device 204. Content items of the shareable content can include multiple versions of a content item. For example, a content item may include a lowest supported version of a content item 206, as well as an upgraded version of the content item 208. The lowest supported version of the content item 206 is a version that may run on a broader range of peer devices than the upgraded version of the content item 208. For example, an upgraded version of a software application may require hardware capabilities, or an operating system version, that is not supported by older devices, or by devices that have less capable hardware configurations.

The peer communication manager 128 for each respective device is implemented to establish and manage the device and data communications via a communication link 210 between the computing device 202 and the peer device 204. The peer sharing manager 126 at the computing device 202 is implemented to share a content item of the shareable content 124, such as a software application, with the peer device 204. The peer sharing manager can initiate communication to share the lowest supported version of the content item 206 to the peer device 204, and the peer communication manager 128 communicates the lowest supported version of the content item to the peer device using one of the communication transceivers 116 via the communication link 210.

As shown at 212, the peer device 204 receives and installs the lowest supported version of the content item 206. In embodiments, the lowest supported version of the content item 206 that is installed on the peer device 204 can determine peer device capability information 214 of the peer device, such as an operating system version, API versions, hardware capabilities, content licenses, and any other type of capability information associated with the peer device. Alternatively or in addition, the peer device 204 may implement an instance of the peer sharing manager 126 that is implemented to determine the peer device capability information of the peer device. The peer sharing manager 126 at the computing device 202 can then receive the capability information 214 from the peer device 204, as shown at 216 and, based on the capability information, determine whether or not the upgraded version of the content item 208 is compatible with the peer device.

If the peer sharing manager 126 determines that the upgraded version of the content item 208 is compatible with the peer device 204, then the peer sharing manager initiates communication of the upgraded version of the content item 208 to the peer device 204, as shown at 218. The peer device 204 receives and installs the upgraded version of the content item 208, which replaces or can be executed in place of, the lowest supported version of the content item 206. Additionally, the upgraded version of the content item 208 may include an instance of the peer sharing manager 126, which is distributed to the peer device 204 from the computing device along with the upgraded version of the content item 208.

In embodiments, the computing device 202 has Internet connectivity to obtain content items of the shareable content 124, as well as upgraded versions of the content items, from on-line sources, such as software and/or content providers, on-line stores, and other types of distributors on the Internet. The computing device 202 can connect to the on-line content sources (via constant or intermittent Internet connectivity) and download the content, which is then shared with other peer devices. For example, the computing device 202 could be a smart phone that a user takes from a home with no Internet service to an area that does have Internet connectivity. While the computing device 202 is connected to the Internet, the shareable content items are downloaded and later shared with other peer devices at the home.

In this example system 200, a single content item is described, with the lowest supported version of the content item 206 and the upgraded version of the content item 208. In implementations, the computing device 202 may contain multiple different content items, each with a lowest supported version and an upgraded version, as well as additional versions of a content item. Each content item may be any form of digital content, such as software applications, media files, and/or any other type of digital content and upgrades associated with an application, media file, and digital content.

For example, the lowest supported version of a media file may be one or more episodes of a particular television show, and the upgraded version of the media file may be later episodes in the same television series, or additional seasons in the series of the television show. In the case of a software application, the lowest supported version of the application may be an older or initial version of the application, a reduced function version of the application, or a version of the application designed to execute on a less capable hardware platform. The upgraded version of the application may then be an enhanced version with updated capabilities, a version that is supported only by peer devices with newer hardware capabilities, a version that requires a newer version of an operating system for execution, or that simply contains bug fixes or other software updates.

In implementations, the upgraded version of the content item 208 may include, contain, or otherwise integrate the lowest supported version of the content item 206. These two versions of the content item may be distributed and configured in any number of ways, such as the upgraded version of the content item 208 including the lowest supported version of the content item 206, or the upgraded version and the lowest supported version being separate items stored as the shareable content 124 of the device data 122. The functions of the peer sharing manager 126 may be implemented as a separate module by a computing device that shares multiple content items. Alternatively or in addition, the peer sharing manager functions may be incorporated into the upgraded version of the content item 208 and/or in the lowest supported version of the content item, or the functions may be distributed between the different versions of the content item and the peer sharing manager. The operations described herein apply to any configuration, regardless of the partitioning of these functions. Similarly, the capability information of the peer device 204 may be determined by the lowest supported version of the content item 206 that is installed on the peer device, determined by a peer sharing manager 126 that is implemented by the peer device, or by a combination of the peer sharing manager and the lowest supported version of the content item.

Additionally, the second peer device 204 may further share content items with other peer devices utilizing the same device to device content upgrades techniques that the computing device 202 shared the content item with the peer device 204. Further, the computing device 202 may share various content items and upgrades with multiple other peer devices utilizing the same described sharing techniques. The initiation of sharing a content item, such as a software application, media file, or an upgrade may be performed in any number of ways, such as by the computing device 202 determining that the peer device 204 is in proximity, a user initiating content sharing and upgrades from either of the computing device 202 or the peer device 204, a scheduled push of new software applications from the computing device 202 to the peer device 204, a query from the peer device 204 to the computing device 202, and/or by any other techniques that are contemplated.

Example methods 300 and 400 are described with reference to respective FIGS. 3 and 4 in accordance with implementations of device to device content upgrades. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 3:
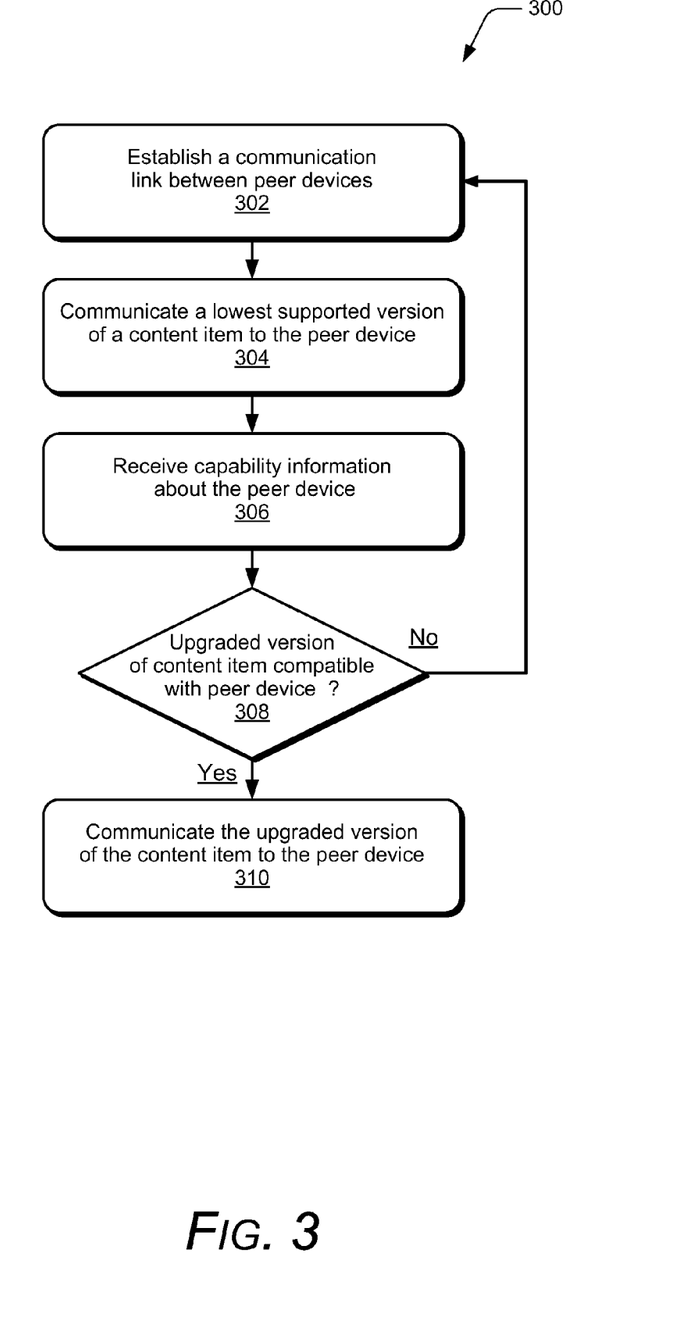
FIG. 3 illustrates an example method for device to device content upgrades in accordance with one or more embodiments.

FIG. 3 illustrates example method(s) 300 of device to device content upgrades and is generally described with reference to a peer device that provides shareable content items with one or more additional peer devices. The order in which the method is described is not intended to be construed as a limitation, and any number or combination of the described method operations can be performed in any order to perform a method, or an alternate method.

At 302, a communication link is established between peer devices. For example, the computing device 202 and the peer device 204 (FIG. 2) each implement an instance of the peer communication manager 128 that establishes a peer-to-peer communication link 210 between the respective devices for device and data communications between the computing device 202 and the peer device 204. The peer-to-peer communication link 210 can be established by the peer communication managers utilizing the wireless transceivers 118 and/or the wired transceivers 120 of the respective devices.

At 304, a lowest supported version of a content item is communicated to a peer device. For example, the peer sharing manager 126 of the computing device 202 initiates communication to share the lowest supported version of the content item 206, and the peer communication manager 128 communicates the lowest supported version of the content item to the peer device 204 using one of the communication transceivers 116 via the communication link 210. The peer device 204 receives and installs the lowest supported version of the content item 206, which can then determine the peer device capability information 214 of the peer device, such as an operating system version, API versions, hardware capabilities, content licenses, and any other type of capability information associated with the peer device.

At 306, capability information about the peer device is received from the peer device and, at 308, a determination is made as to whether an upgraded version of the content item is compatible with the peer device. For example, the peer sharing manager 126 at the computing device 202 receives the capability information 214 from the peer device 204 and, based on the capability information, determines whether or not the upgraded version of the content item 208 is compatible with the peer device. The capability information 214 is received either in response to a request from the computing device 202 that is transmitted to the peer device 204, or is pushed from the peer device 204 to the computing device 202 as a result of the installation of the lowest supported version of the content item 206 that is communicated to the computing device 202.

If the upgraded version of the content item 208 is not supported by the capabilities of the peer device (i.e., "No" from 308), then the method continues at 302 and the computing device 202 can establish another communication link with one or more additional peer devices. If the upgraded version of the content item 208 is compatible with the peer device 204 (i.e., "Yes" from 308), then the upgraded version of the content item is communicated to the peer device. For example, the peer sharing manager 128 initiates communication of the upgraded version of the content item 208

Figure 4:
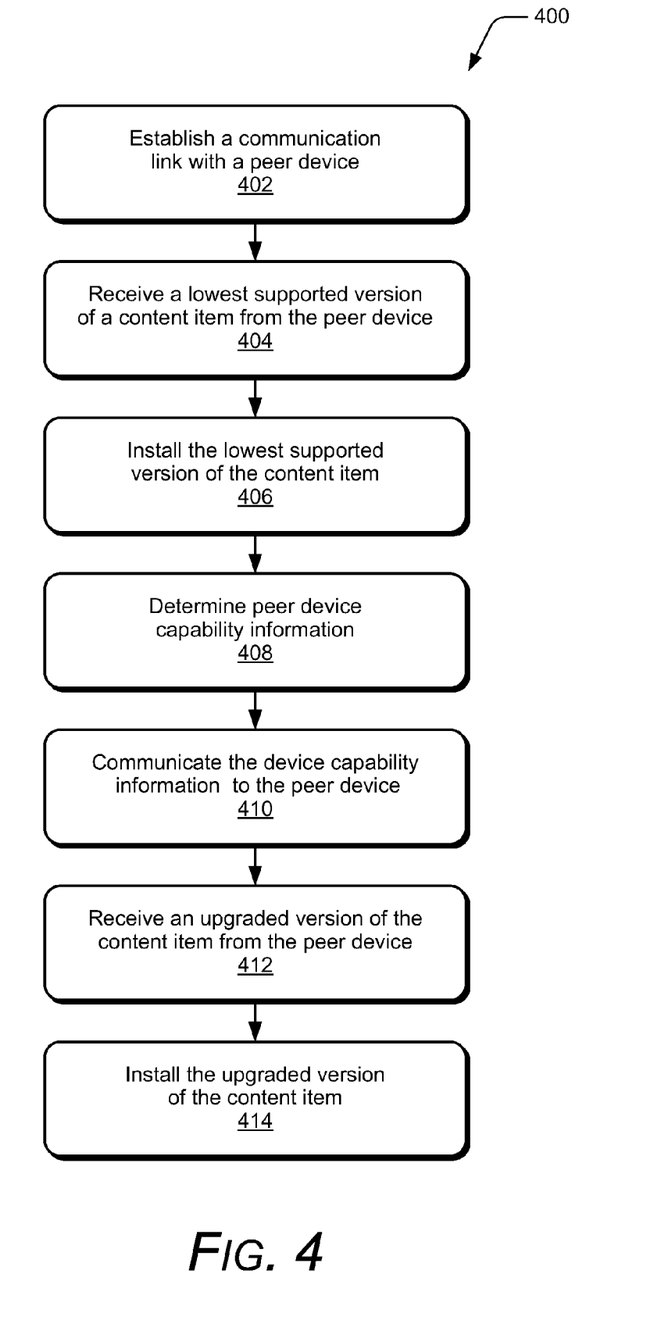
FIG. 4 illustrates another example method for device to device content upgrades in accordance with one or more embodiments.

FIG. 4 illustrates other example method(s) 400 of device to device content upgrades, and is generally described with reference to a peer device that receives shareable content items from another peer device. The order in which the method is described is not intended to be construed as a limitation, and any number or combination of the described method operations can be performed in any order to perform a method, or an alternate method.

At 402, a communication link is established between peer devices. For example, the computing device 202 and the peer device 204 (FIG. 2) each implement an instance of the peer communication manager 128 that establishes a peer-to-peer communication link 210 between the respective devices for device and data communications between the computing device 202 and the peer device 204. The peer-to-peer communication link 210 can be established by the peer communication managers utilizing the wireless transceivers 118 and/or the wired transceivers 120 of the respective devices.

At 404, a lowest supported version of a content item is received from a peer device and, at 406, the lowest supported version of the content item is installed. For example, the peer device 204 receives the lowest supported version of the content item 206 from the computing device 202 (e.g., a peer device), and the peer device installs the content item.

At 408, peer device capability information is determined. For example, the lowest supported version of the content item 206 that is installed on the peer device 204 can determine the peer device capability information 214 of the peer device, such as an operating system version, API versions, hardware capabilities, content licenses, and any other type of capability information associated with the peer device. Alternatively or in addition, the peer device 204 may implement an instance of the peer sharing manager 126 that is implemented to determine the peer device capability information of the peer device.

At 410, the device capability information is communicated to the peer device. For example, the peer device 204 communicates the peer device capability information 214 to the computing device 202 (e.g., a peer device), and the peer sharing manager 126 at the computing device 202 determines whether or not the upgraded version of the content item 208 is compatible with the peer device 204 based on the capability information.

At 412, an upgraded version of the content item is received from the peer device and, at 414, the upgraded version of the content item is installed. For example, the peer device 204 receives the upgraded version of the content item 208 from the computing device 202 (e.g., a peer device), and the peer device installs the content item. The peer device 204 receives and installs the upgraded version of the content item 208, which replaces or can be executed in place of, the lowest supported version of the content item 206. Additionally, the upgraded version of the content item 208 may include an instance of the peer sharing manager 126, which is distributed to the peer device 204 from the computing device along with the upgraded version of the content item 208.

Figure 5:
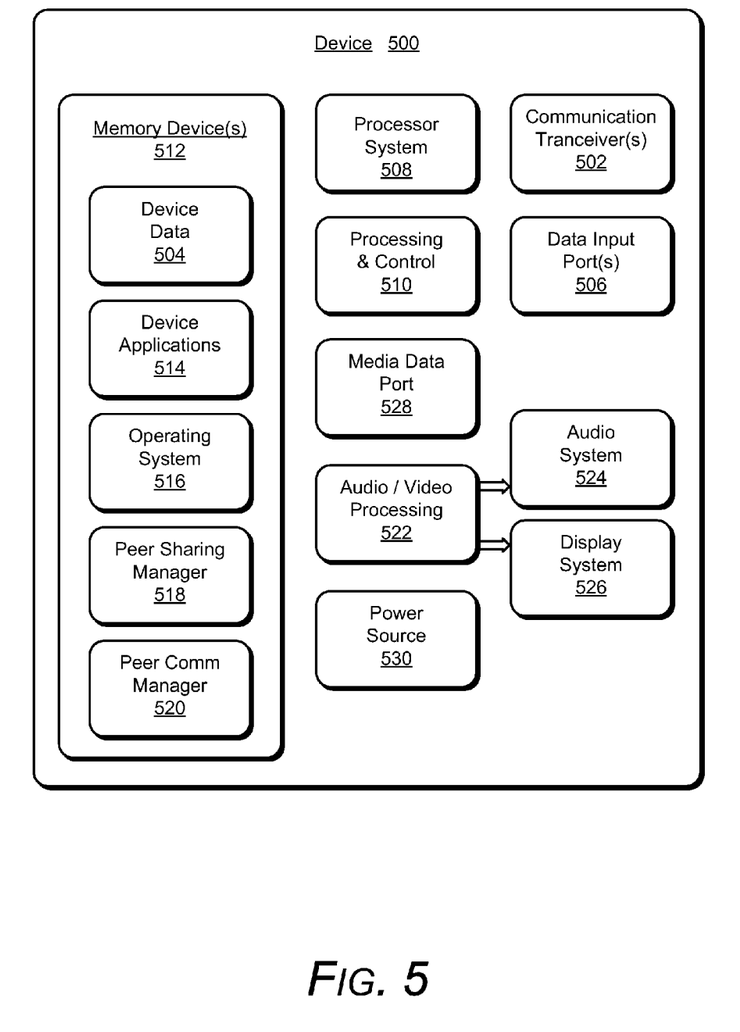
FIG. 5 illustrates various components of an example electronic device that can implement embodiments of device to device content upgrades.

FIG. 5 illustrates various components of an example device 500 that can be implemented as any of the devices described with reference to any of the previous FIGS. 1-4. In embodiments, the example device may be implemented in any form of electronic and/or computing device, such as a fixed or mobile device, in any form of a consumer, computer, portable, user, communication, phone, navigation, gaming, messaging, Web browsing, paging, media playback, mobile hotspot, wireless router, and/or other type of electronic device, such as the computing device 102 described with reference to FIG. 1.

The device 500 includes communication transceivers 502 that enable wired and/or wireless communication of device data 504, such as the keyword broadcasts, metadata, requests for content items, and/or other device data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular telephony, wireless metropolitan area network (WMAN) radios compliant with various IEEE 802.15 (WiMAX™) standards, and wired local area network (LAN) Ethernet transceivers.

The device 500 may also include one or more data input ports 506 via which any type of data, media content, and/or inputs can be received, such as user-selectable inputs, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, The device 500 includes a processor system 508 of one or more processors (e.g., any of microprocessors, multi-core processors, controllers, and the like) and/or a processor and memory system (e.g., implemented in an SoC) that processes computer-executable instructions. The processor system can include a digital signal processing (DSP) subsystem for processing signals and data of the device. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware.

Alternatively or in addition, the device can be implemented with any one or combination of software, hardware, firmware, or fixed logic circuitry that is implemented in connection with processing and control circuits, which are generally identified at 510. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 also includes one or more memory devices 512 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The device 500 may also include a mass storage media device.

A memory device 512 provides data storage mechanisms to store the device data 504, other types of information and/or data, and various device applications 514 (e.g., software applications). For example, an operating system 516 can be maintained as software instructions with a memory device and executed by the processor system 508. The device applications may also include a device manager, such as any form of a control application, software application, signal-processing and control module, code that is native to a particular device, a hardware abstraction layer for a particular device, and so on.

The device may also include a peer sharing manager 518 and a peer communication manager 520 in embodiments of device to device content upgrades, such as when the device 500 is implemented as any of the devices described with reference to FIGS. 1-4. The peer sharing manager 518 is an example of the peer sharing manager 126 and the peer communication manager 520 is an example of the peer communication manager 128 that are described with reference to FIGS. 1-4.

The device 500 also includes an audio and/or video processing system 522 that generates audio data for an audio system 524 and/or generates display data for a display system 526. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 528. In implementations, the audio system and/or the display system are integrated components of the example device.

The device 500 can also include a power source 530, such as when the device is implemented as a mobile device. The power source may include a charging and/or power system, and can be implemented as a flexible strip battery, a rechargeable battery, a charged super-capacitor, and/or any other type of active or passive power source.

Although embodiments of device to device content upgrades have been described in language specific to features and/or methods, the subject of the appended claims is not necessarily limited to the specific features or methods described. Rather, the specific features and methods are disclosed as example implementations of device to device content upgrades.

The invention claimed is:

1. A computing device, comprising:
a memory configured to maintain content items of shareable content that includes a lowest supported version of a content item and an upgraded version of the content item;
a processor system to implement computer-executable instructions as a peer communication manager and a peer sharing manager, the peer communication manager configured to manage communications with a peer device, and the peer sharing manager configured to:
share the lowest supported version of the content item with the peer device using a peer-to-peer communication;
receive capability information about the peer device from the peer device through the peer-to-peer communication; and
determine whether to share the upgraded version of the content item with the peer device based on the received capability information about the peer device.

2. The computing device as recited in claim 1, wherein the peer sharing manager is configured to:
initiate communication to share the lowest supported version of the content item to the peer device, effective to enable the peer device to install the lowest supported version of the content item; and
receive the capability information about the peer device initiated from the lowest supported version of the content item that is installed on the peer device.

3. The computing device as recited in claim 2, wherein the peer sharing manager is further configured to determine if the upgraded version of the content item is compatible with the peer device from the received capability information about the peer device.

4. The computing device as recited in claim 3, wherein the peer sharing manager is configured to initiate communication of the upgraded version of the content item to the peer device responsive to a determination that the upgraded version of the content item is compatible with the peer device.

5. The device as recited in claim 1, wherein the upgraded version of the content item includes the peer sharing manager.

6. The computing device as recited in claim 1, wherein the capability information about the peer device comprises one or more of an API version, a hardware capability, or a content license.

7. The computing device as recited in claim 1, wherein the shareable content comprises one or more of a software application, audio data, video data, and image data.

8. The computing device as recited in claim 1, wherein the computing device is one or more of a wired and wireless device further comprising at least one of:
a wired communication transceiver configured for wired peer-to-peer communication with the peer device; and
a wireless communication transceiver configured for wireless peer-to-peer communication with the peer device.

9. A method in a first peer device, comprising:
obtaining, by the first peer device, content items from a content distributor via a network connection;
communicating, by the first peer device, a lowest supported version of a content item to a second peer device, effective to enable the second peer device to install the lowest supported version of the content item;
in response to communicating the lowest supported version of the content item, receiving, by the first peer device, capability information about the second peer device as determined from the lowest supported version of the content item that is installed on the second peer device;

determining, by the first peer device, whether an upgraded version of the content item is compatible with the second peer device based on the received capability information; and responsive to said determining, communicating, by the first peer device, the upgraded version of the content item to the second peer device, effective to enable the second peer device to install the upgraded version of the content item.

10. The method as recited in claim 9, wherein the upgraded version of the content item performs said determining whether the upgraded version of the content item is compatible with the second peer device.

11. The method as recited in claim 9, wherein the upgraded version of the content item includes a peer sharing manager that is configured to share the lowest supported version of the content item and the upgraded version of the content item with one or more additional peer devices.

12. The method as recited in claim 9, wherein the content item comprises one or more of a software application, audio data, video data, and image data.

13. The method as recited in claim 9, wherein the capability information about the second peer device comprises one or more of an API version, a hardware capability, or a content license.

14. A peer device, comprising:
a memory configured to maintain shared content items;
a processor system to implement computer-executable instructions as a peer communication manager and a peer sharing manager, the peer communication manager configured to manage communications with a computing device, wherein the peer device does not have a network connection to obtain content items from a content distributor, and the peer sharing manager configured to:
receive a lowest supported version of a content item from the computing device using a peer-to-peer communication;
install the received lowest supported version of the content item that is executable to determine capability information about the peer device;
initiate communication of the determined capability information about the peer device to the computing device through the peer-to-peer communication; and
receive an upgraded version of the content item from the computing device through the peer-to-peer communication responsive to a determination that the upgraded version of the content item is compatible with the peer device based on the capability information about the peer device.

15. The peer device as recited in claim 14, wherein the peer sharing manager is configured to install the received upgraded version of the content item for execution on the peer device.

16. The peer device as recited in claim 14, wherein the upgraded version of the content item includes a version of the peer sharing manager that is configured to share the lowest supported version of the content item and the upgraded version of the content item with one or more additional peer devices.

17. The peer device as recited in claim 16, wherein the included version of the peer sharing manager is configured to:
share the lowest supported version of the content item with an additional peer device;
receive capability information about the additional peer device; and
determine whether to share the upgraded version of the content item with the additional peer device based on the received capability information about the additional peer device.

18. The peer device as recited in claim 14, wherein the shareable content comprises one or more of a software application, audio data, video data, and image data.

19. The peer device as recited in claim 14, wherein the capability information about the peer device comprises one or more of an API version, a hardware capability, or a content license.

20. The peer device as recited in claim 14, wherein the computing device is one or more of a wired and wireless device further comprising at least one of:
a wired communication transceiver configured for wired peer-to-peer communication with the computing device; and
a wireless communication transceiver configured for wireless peer-to-peer communication with the computing device.

* * * * *